United States Patent
Nishimura et al.

(10) Patent No.: US 10,704,556 B2
(45) Date of Patent: Jul. 7, 2020

(54) MOTOR, TURBOCHARGER AND ASSEMBLY METHOD TURBOCHARGER

(71) Applicant: MITSUBISHI HEAVY INDUSTRIES, LTD., Tokyo (JP)

(72) Inventors: Hidetaka Nishimura, Nagasaki (JP); Takeshi Tsujii, Nagasaki (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 224 days.

(21) Appl. No.: 15/690,919

(22) Filed: Aug. 30, 2017

(65) Prior Publication Data

US 2019/0063445 A1    Feb. 28, 2019

(51) Int. Cl.
| | |
|---|---|
| *F04D 25/06* | (2006.01) |
| *F04D 29/58* | (2006.01) |
| *F04D 29/42* | (2006.01) |
| *F04D 25/02* | (2006.01) |
| *H02K 5/173* | (2006.01) |

(52) U.S. Cl.
CPC ............ *F04D 25/06* (2013.01); *F04D 25/024* (2013.01); *F04D 25/0606* (2013.01); *F04D 29/4206* (2013.01); *F04D 29/5853* (2013.01); *H02K 5/1732* (2013.01); *F05D 2230/60* (2013.01)

(58) Field of Classification Search
CPC ...... H02K 7/14; H02K 5/15; H02K 5/161732; H02K 15/02; F02B 39/10; F02B 37/10; F02B 39/02; F05D 2230/60; F04D 25/06; F04D 25/0606; F04D 29/053; F04D 29/284; F04D 25/024

USPC .......................................................... 310/91
See application file for complete search history.

(56) References Cited

U.S. PATENT DOCUMENTS

| | | | |
|---|---|---|---|
| 2007/0108772 A1* | 5/2007 | Shibui | F01D 15/10 290/52 |
| 2009/0212649 A1* | 8/2009 | Kingman | H02K 1/185 310/91 |
| 2016/0369817 A1 | 12/2016 | Tsuji et al. | |

FOREIGN PATENT DOCUMENTS

| | | |
|---|---|---|
| JP | 2001-159429 A | 6/2001 |
| JP | 2015-86817 A | 5/2015 |
| JP | 2015-169073 A | 9/2015 |
| JP | 5894203 B2 | 3/2016 |

* cited by examiner

*Primary Examiner* — Kenneth J Hansen
(74) *Attorney, Agent, or Firm* — Westermann, Hattori, Daniels & Adrian, LLP (57) ABSTRACT

An turbocharger with an electric motor (30) includes a housing (33), stator (32), and motor rotor. The housing (33) has first stator fixing section (131) and a second stator fixing section (132) formed in an inner peripheral surface of the housing (33) that fixes the stator (32) in the housing. The stator (32) has a first fixed section (121) formed in an outer peripheral surface of the stator (32) fitted to the first stator fixing section (131) and a second fixed section (122) that has a smaller outer diameter than the first fixed section (121) fitted to the second stator fixing section (132) in an outer peripheral surface of the stator (32). A large clearance section having a space is formed between the inner peripheral surface of the housing and the outer peripheral surface of the stator. The instant invention allows precise positioning of the stator and improved heat conduction.

5 Claims, 9 Drawing Sheets

MOTOR, TURBOCHARGER AND ASSEMBLY METHOD TURBOCHARGER

TECHNICAL FIELD

The present invention relates to a motor, a turbocharger, and an assembly method for a turbocharger.

BACKGROUND ART

A turbocharger compresses combustion air of an internal combustion engine and sends high-density air into a combustion chamber. In the turbocharger, a compressor section that compresses combustion air, and a turbine section that is driven by energy held by exhaust gas of the internal combustion engine, and that serves as a driving source of the compressor section are provided coaxially.

As such a turbocharger, an electric-motor assisted turbocharger including a motor is known. In the electric-motor assisted turbocharger, for example, in a case where an internal combustion engine is in a low load state, and an amount of exhaust gas is not sufficient, the motor is energized, and driving of a compressor section is assisted by driving force of the motor.

PTL 1 discloses a motor of an electric-motor assisted turbocharger including a motor rotor provided in a shaft extension section that extends a rotor shaft of a turbine toward an intake air introduction passage side, and a stator provided around the motor rotor. The motor rotor is mounted on the shaft extension section of the rotor shaft of the turbine, so that this motor is supported by a bearing (bearing of the rotor shaft) supporting a turbocharger body. In such a motor, the motor rotor itself does not have a bearing, and a so-called motor overhang structure is employed.

The stator of the motor in the motor overhang structure is located in a cylindrical housing supported by a turbocharger body. When the turbocharger is assembled, the motor rotor is mounted on the rotor shaft, the housing is thereafter fixed to the turbocharger body, and then the stator is inserted (pressed) into the inside of the housing to be fixed to the housing by predetermined fitting.

CITATION LIST

Patent Literature

{PTL 1}
Japanese Unexamined Patent Application, Publication No. 2015-86817

SUMMARY OF INVENTION

Technical Problem

However, when the stator is inserted into the inside of the housing, friction occurs between the stator and the housing, and therefore mounting of the stator requires time and labor. When fitting of the stator and the housing is loosened in order to reduce friction, positioning precision of the stator with respect to the motor rotor may be lowered, or deterioration of performance of the motor due to lowering of the heat conduction between the stator and the housing may be caused.

The present invention has been made in view of such a circumstance, and an object of the present invention is to provide a motor, a turbocharger, and an assembly method for a turbocharger, in which it is possible to improve an assembling property while securing positioning precision of a stator, and heat conduction between the stator and a housing.

Solution to Problem

A motor according to a first aspect of the present invention includes: a housing that is cylindrical; a stator located inside the housing; and a motor rotor that rotates inside the stator, wherein the housing includes: a first stator fixing section that is formed in an inner peripheral surface of the housing, and fixes the stator; and a second stator fixing section that is formed at a position spaced from the first stator fixing section in the axial direction of the housing, in the inner peripheral surface of the housing, and that has a smaller inner diameter than the first stator fixing section, and the stator includes: a first fixed section that is formed in an outer peripheral surface of the stator, and is fitted to the first stator fixing section; and a second fixed section that is formed at a position spaced from the first fixed section in the axial direction of the stator, in the outer peripheral surface of the stator, that has a smaller outer diameter than the first fixed section, and that is fitted to the second stator fixing section.

According to this configuration, the stator located in the housing is positioned to be fixed at the two places at the interval in the axial direction of the stator by the fitting of the first stator fixing section and the first fixed section, and the fitting of the second stator fixing section and the second fixed section. Additionally, the stator and the housing are reliably in close contact with each other, and it is possible to suppress lowering of heat conduction from the stator to the housing.

The second stator fixing section and the second fixed section have smaller diameters than the first stator fixing section and the first fixed section. Consequently, when the stator is inserted into the housing, the stator is inserted from the first stator fixing section side toward the second stator fixing section side of the housing, so that it is possible to easily assemble the stator to the housing while suppressing interference of the stator with the housing.

In the above first aspect, between a first fitting section, which is comprised of the first stator fixing section and the first fixed section, and a second fitting section, which is comprised of the second stator fixing section and the second fixed section, a large clearance section having a larger clearance between the inner peripheral surface of the housing and the outer peripheral surface of the stator than the first fitting section and the second fitting section may be formed.

According to this configuration, when the stator is inserted into the housing, the stator is inserted from a side of the first stator fixing section toward a side of the second stator fixing section side of the housing, so that interference of the stator with the housing can be suppressed until the first fixed section is fitted to the first stator fixing section, and the second fixed section is fitted to the second stator fixing section after the second fixed section of the stator passes through the first stator fixing section side of the housing.

In the above first aspect, an inner diameter of the housing and an outer diameter of the stator in the large clearance section may be formed so as to have such dimensions as to attain clearance fit.

According to this configuration, it is possible to suppress interference of the stator with the housing, when the stator is inserted into the housing.

In the above first aspect, thermal grease may be disposed between the housing and the stator in the large clearance section.

According to this configuration, heat conduction between the stator and the housing can be enhanced also in the large clearance section by thermal grease. Additionally, the thermal grease is disposed in the large clearance section, so that it is possible to suppress insertion resistance of the stator by the viscosity of the thermal grease.

A turbocharger according to a second aspect of the present invention includes: a compressor section that compresses air; a rotor shaft that is connected to the compressor section; and the motor according to the first aspect, the motor having the motor rotor connected to an end of the rotor shaft.

According to this configuration, the stator located inside the housing is positioned to be fixed at the two places at the interval in the axial direction of the stator by the fitting of the first stator fixing section and the first fixed section, and the fitting of the second stator fixing section and the second fixed section.

Additionally, when the stator is inserted into the housing, it is possible to easily assemble the stator to the housing while suppressing interference of the stator with the housing.

An assembly method for a turbocharger according to a third aspect of the present invention being an assembly method for the turbocharger of the above second aspect, the assembly method including: a rotor mounting step of connecting the motor rotor to the rotor shaft and mounting the motor rotor on the rotor shaft; a housing mounting step of fixing and supporting the housing so as to be concentric with the rotor shaft; and a stator mounting step of inserting and incorporating the stator into the housing from a side of the first stator fixing section toward a side of the second stator fixing section of the housing.

According to this configuration, the stator located inside the housing is positioned to be fixed at the two places at the interval in the axial direction of the stator by the fitting of the first stator fixing section and the first fixed section, and the fitting of the second stator fixing section and the second fixed section.

Additionally, when the stator is inserted into the housing, it is possible to easily assemble the stator to the housing while suppressing interference of the stator with the housing.

Advantageous Effects of Invention

According to the present invention, it is possible to improve an assembling property while securing positioning precision of a stator, and heat conduction between the stator and a housing.

DESCRIPTION OF EMBODIMENTS

Hereinafter, a motor, a turbocharger, and an assembly method for a turbocharger according to an embodiment of the present invention will be described with reference to the drawings.

Figure 1:
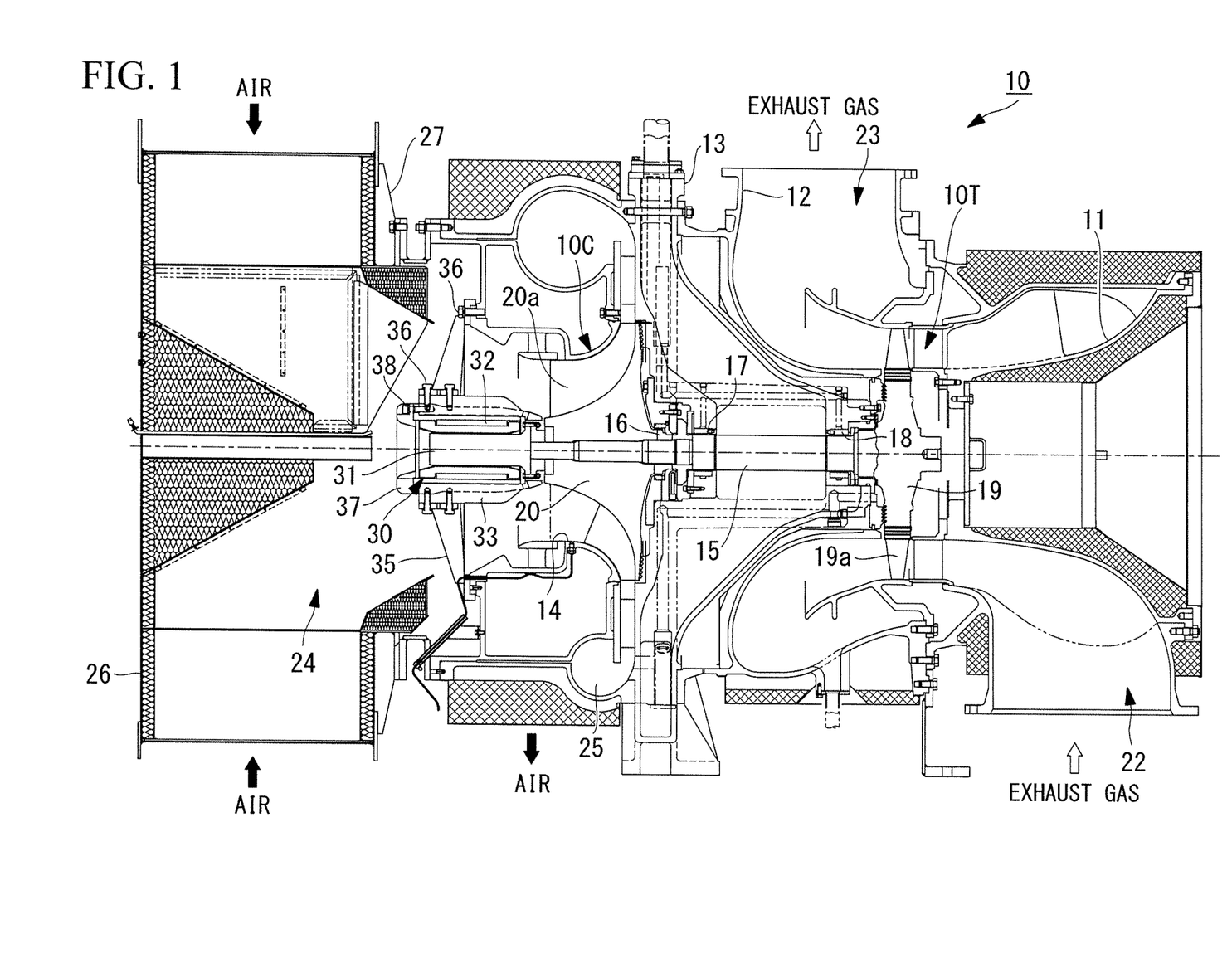
FIG. 1 is a longitudinal sectional view illustrating a configuration of a turbocharger according to an embodiment of the present invention.

As illustrated in FIG. 1, a turbocharger 10 of this embodiment includes a bearing stand 13, a turbine section 10T provided on one side of the bearing stand 13, a compressor section 10C provided on the other side of the bearing stand 13, and a motor 30.

The turbocharger 10 includes a gas inlet casing 11 and a gas outlet casing 12 on the turbine section 10T side. The turbocharger 10 includes an air guide casing 14 on the compressor section 10C side. These gas inlet casing 11, gas outlet casing 12, bearing stand 13, and air guide casing 14 are integrally fastened by bolts (not illustrated).

The turbocharger 10 includes a rotor shaft 15 provided rotatably around the central axis. The rotor shaft 15 is rotatably supported by a thrust bearing 16 and radial bearings 17, 18 provided in the bearing stand 13. The rotor shaft 15 has one end provided with a turbine 19 constituting the turbine section 10T, and the other end provided with a compressor impeller 20 constituting the compressor section 10C.

The turbine 19 has an outer peripheral part provided with a large number of blades 19a. These blades 19a are disposed between an exhaust gas introduction passage 22 provided in the gas inlet casing 11, and an exhaust gas discharge passage 23 provided in the gas outlet casing 12.

The compressor impeller 20 has an outer peripheral part provided with a large number of blades 20a. The blades 20a are disposed on the downstream side of an intake air introduction passage 24 provided in the air guide casing 14. The intake air introduction passage 24 is connected to a vortex chamber 25 through the compressor impeller 20. The vortex chamber 25 is connected to a combustion chamber of an engine through a compressed air introduction passage (not illustrated).

The turbocharger 10 includes a silencer 26 on the upstream side of the intake air introduction passage 24. The silencer 26 has a filter function of allowing intake air to pass to rectify an air flow, and a muffling function of absorbing noise generated by air suction. This silencer 26 is supported by the air guide casing 14 through an intermediate piece 27.

The motor 30 is connected to the rotor shaft 15. This motor 30 has a structure in which the rotor shaft 15 extends toward the intake air introduction passage 24 side to be mounted, that is, a motor overhang structure in which the motor 30 does not have a dedicated bearing. Therefore, the motor 30 and a below-described motor rotor 31 of the motor 30 have a structure supported by the thrust bearing 16 and the radial bearings 17, 18 supporting the rotor shaft 15.

Figure 2:
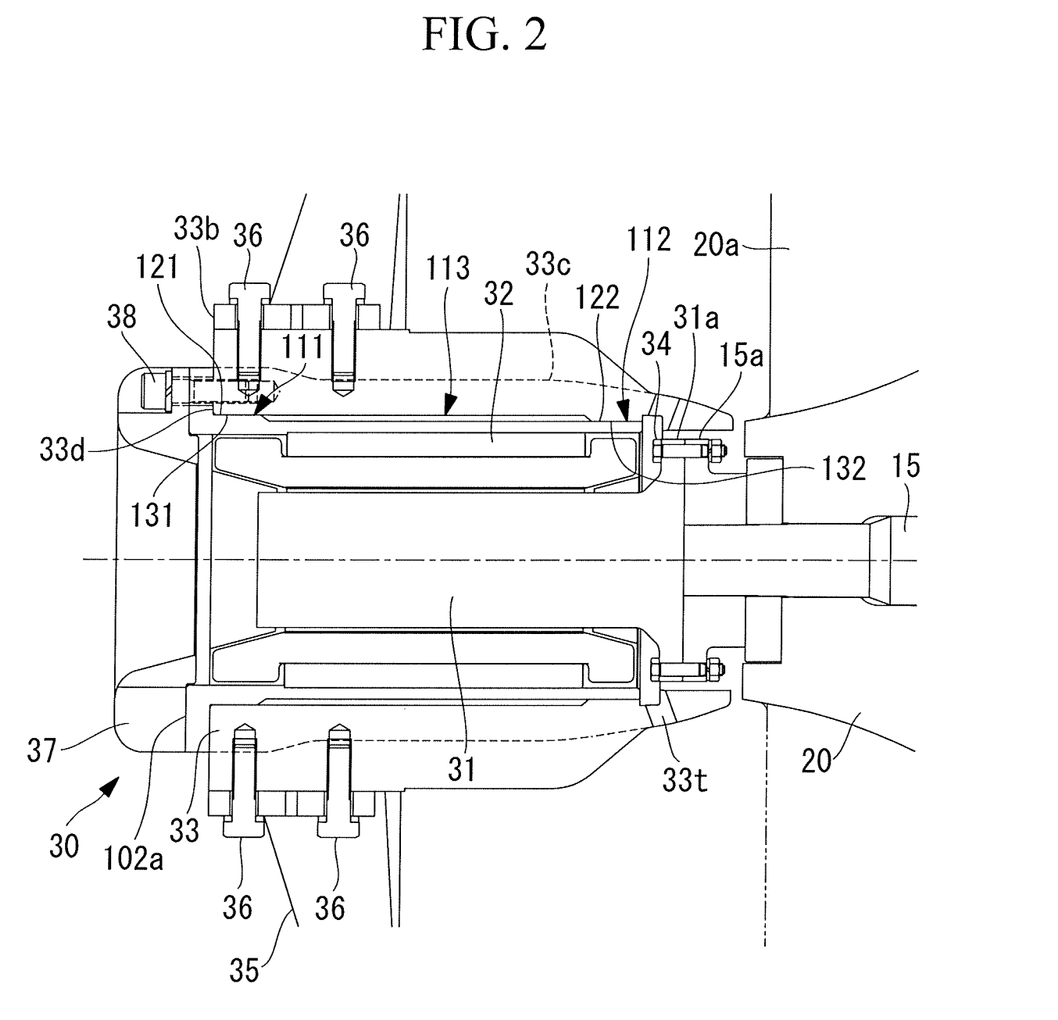
FIG. 2 is an enlarged view of a peripheral part of a motor of the turbocharger illustrated in FIG. 1.

FIG. 2 is an enlarged view of a peripheral part of the above motor 30.

As illustrated in FIG. 2, in the motor 30, the motor rotor 31, a stator 32, and a housing 33 are main components.

The motor rotor 31 is a columnar member having an outer peripheral surface provided with a permanent magnet. The motor rotor 31 has an end connected to an end of the rotor shaft 15 by flange coupling. More specifically, in the motor rotor 31, a flange 31a provided in an end on a side close to the intake air introduction passage 24 of the rotor shaft 15 abuts on a flange 15a provided in an end on a side close to the compressor impeller 20 of the motor rotor 31, and these flanges are fastened to each other by a plurality of bolts and nuts 34. Consequently, the motor rotor 31 is coupled to the rotor shaft 15.

The stator 32 is located and installed in the cylindrical housing 33. In a hollow section of this stator 32, the motor rotor 31 that passes through a shaft central part is disposed in a non-contact state.

On an outer peripheral surface of the housing 33, pedestals 33b provided with bolt holes 33a each fixing an end side of a coupling bar 35b, and radiation fins 33c.

Figure 3:
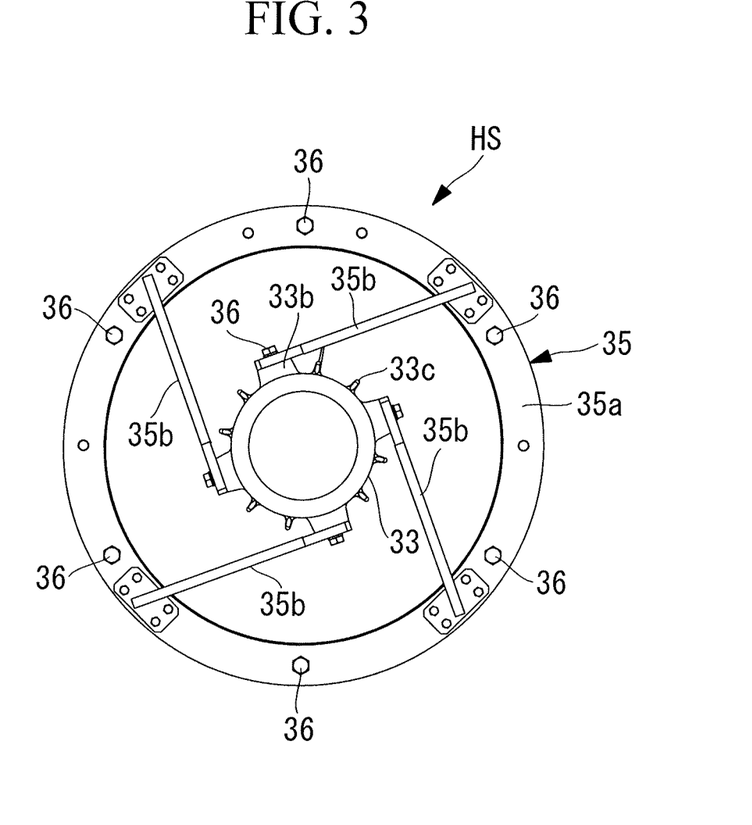
FIG. 3 is a side view of a support member supporting a housing of the motor, viewed from the axial direction of a motor rotor, in the turbocharger according to the embodiment of the present invention.
Figure 4:
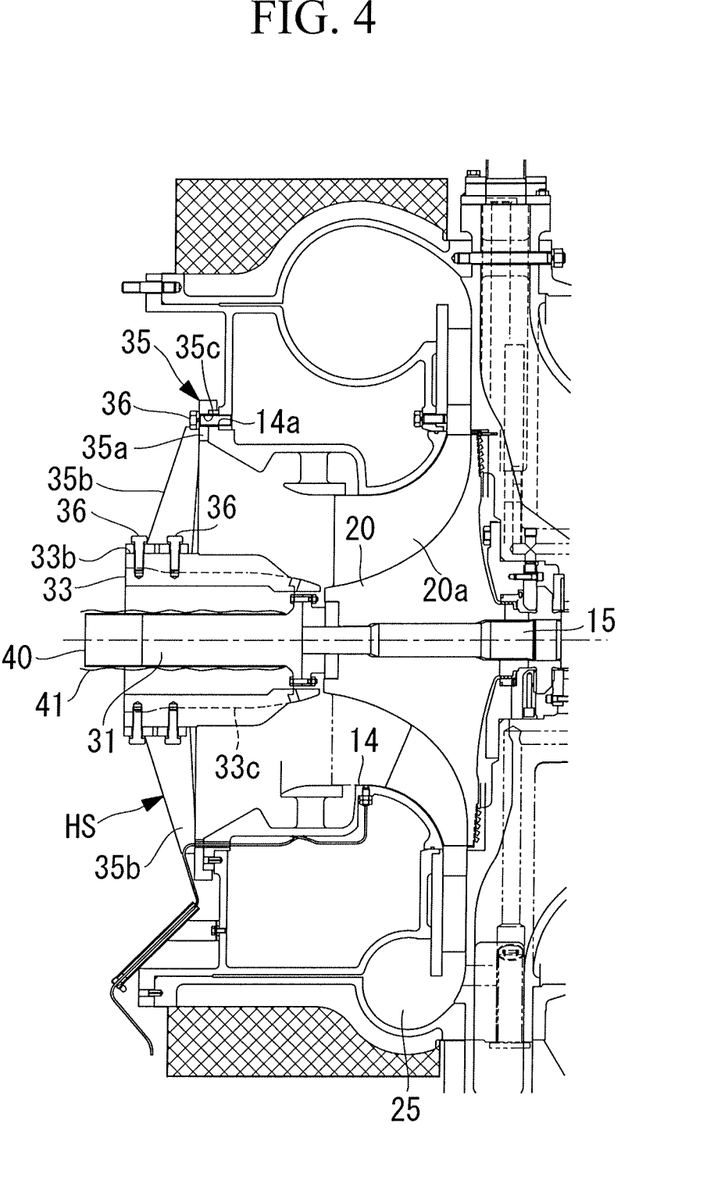
FIG. 4 is a longitudinal sectional view illustrating a state where the housing of the motor is mounted, in an assembly method for the turbocharger according to the embodiment of the present invention.

As illustrated in FIG. 3 and FIG. 4, the housing 33 is supported by the air guide casing 14 through a support member 35.

The support member 35 includes a ring-shaped flange section 35a, and a plurality of (four in this embodiment) coupling bars 35b. In the flange section 35a, a plurality of (six in this embodiment) bolt holes 35c are provided in the circumferential direction at equal pitches. The flange section 35a is fixed to the air guide casing 14 through the bolt holes 35c by bolts 36. The coupling bars 35b are provided so as to couple the flange section 35a to an outer peripheral part of the housing 33. The coupling bars 35b are coupled to the housing 33 by the bolts 36. The housing 33 is held at a shaft central position of the flange section 35a by a plurality of these coupling bars 35b.

As illustrated in FIG. 1, a cap 37 is fixed to be mounted on an end on a side close to the intake air introduction passage 24 of the housing 33 by a hexagon socket bolt 38. This cap 37 is located on a side closer to the compressor impeller 20 than the silencer 26. That is, the motor 30 is downsized up to such a size that a shaft extension section of the rotor shaft 15 does not reach the silencer 26.

Figure 5:
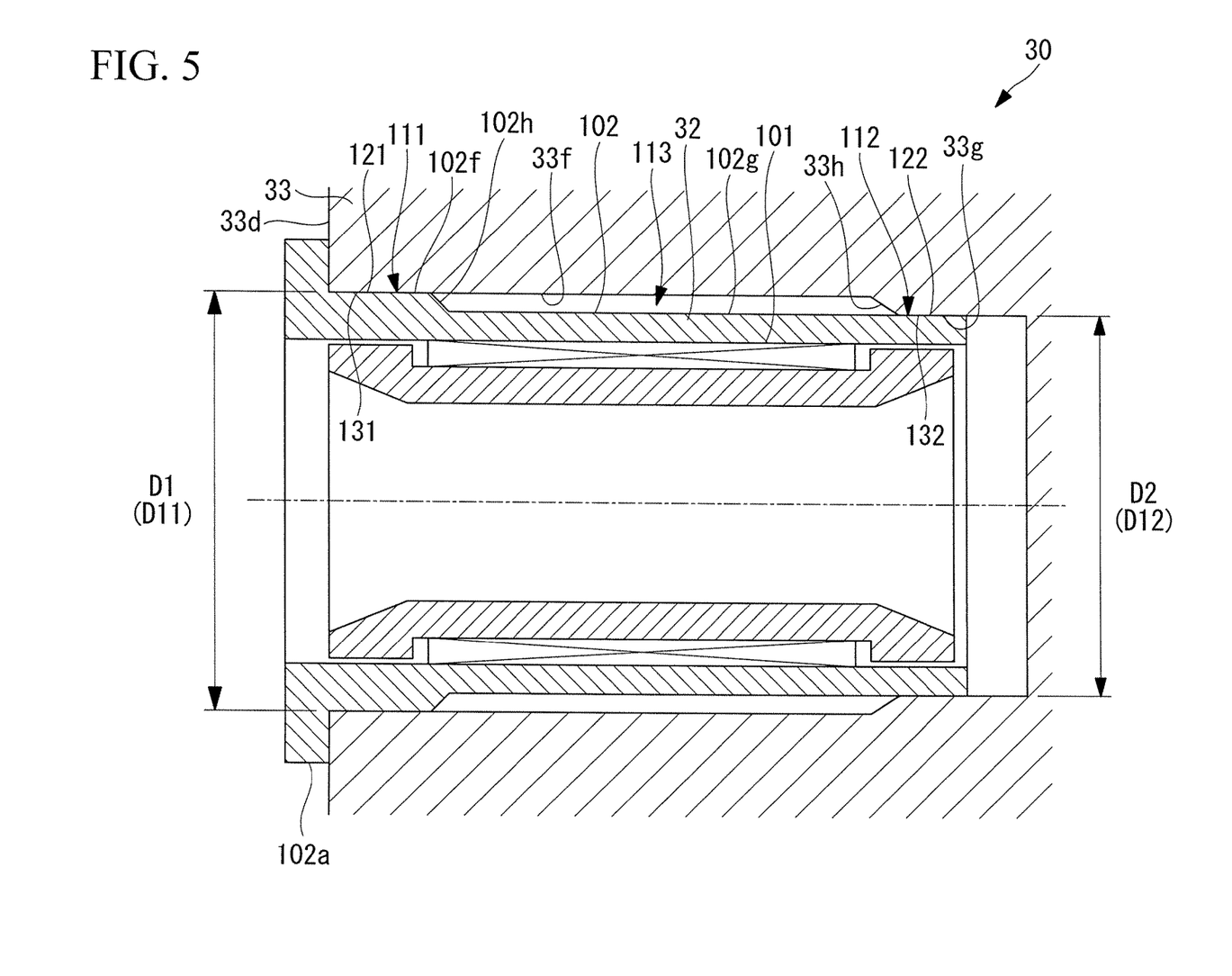
FIG. 5 is an enlarged sectional view illustrating schematic shapes of a stator and the housing of the motor according to the embodiment of the present invention.

As illustrated in FIG. 5, the housing 33 has an inner peripheral surface including a first inner peripheral surface 33f, a second inner peripheral surface 33g, and a radially contracted surface 33h. The first inner peripheral surface 33f is formed over a predetermined length from an end 33d on a side close to the intake air introduction passage 24 toward an end side of the rotor shaft 15 in the inner peripheral surface of the housing 33 so as to have a constant inner diameter D1. The second inner peripheral surface 33g is formed at a portion near the end of the rotor shaft 15 with respect to the first inner peripheral surface 33f in the inner peripheral surface of the housing 33. The second inner peripheral surface 33g is formed so as to have an inner diameter D2 smaller than the inner diameter of the first inner peripheral surface 33f. The radially contracted surface 33h is formed between the first inner peripheral surface 33f and the second inner peripheral surface 33g. The radially contracted surface 33h is formed in a tapered shape such that the inner diameter of the radially contracted surface 33h gradually reduces from the first inner peripheral surface 33f toward the second inner peripheral surface 33g.

In such an inner peripheral surface of the housing 33, a first stator fixing section 131, and a second stator fixing section 132 are formed. The first stator fixing section 131 is formed in a portion near the end 33d on a side close to the intake air introduction passage 24, in the first inner peripheral surface 33f having the inner diameter D1, in the housing 33. The second stator fixing section 132 is formed in the second inner peripheral surface 33g having the inner diameter D2 smaller than the inner diameter D1. Consequently, the second stator fixing section 132 is formed at a position spaced from the first stator fixing section 131 in the axial direction of the housing 33.

The stator 32 includes a stator body 101 having a core wound around a coil, and a stator case 102 storing the stator body 101.

The stator case 102 has a bottomed cylindrical shape, and has an end integrally formed with a flange section 102a protruding toward an outer peripheral side.

Such a stator case 102 of the stator 32 has an outer peripheral surface including a first outer peripheral surface 102f, a second outer peripheral surface 102g, and a radially contracted surface 102h. The first outer peripheral surface 102f is formed over a predetermined length shorter than the first inner peripheral surface 33f of the housing 33 from a side close to the flange section 102a so as to have a constant outer diameter D11. The second outer peripheral surface 102g is formed at a portion spaced from the first outer peripheral surface 102f in the axial direction of the housing 33 from the flange section 102a. The second outer peripheral surface 102g is formed so as to have an outer diameter D12 smaller than the first outer peripheral surface 102f. The radially contracted surface 102h is formed between the first outer peripheral surface 102f and the second outer peripheral surface 102g. The radially contracted surface 102h is formed in a tapered shape such that the outer diameter of the radially contracted surface 102h gradually reduces from the first outer peripheral surface 102f toward the second outer peripheral surface 102g.

In such an outer peripheral surface of the stator case 102 of the stator 32, a first fixed section 121, and a second fixed section 122 are formed. The first fixed section 121 is formed in the first outer peripheral surface 102f having the outer diameter D11, in the outer peripheral surface of the stator case 102. The second fixed section 122 is formed in the second outer peripheral surface 102g having the outer diameter D12 smaller than the outer diameter D11, in the outer peripheral surface of the stator case 102.

In a state where the stator 32 is fitted into the housing 33, the first fixed section 121 radially faces to be fitted to the first stator fixing section 131. Additionally, the second fixed section 122 radially faces to be fitted to the second stator fixing section 132. Thus, the stator 32 is fixed to the housing 33 by a first fitting section 111 of the first stator fixing section 131 and the first fixed section 121, and a second fitting section 112 of the second stator fixing section 132 and the second fixed section 122. Herein, the first fitting section 111 of the first stator fixing section 131 and the first fixed section 121, and the second fitting section 112 of the second stator fixing section 132 and the second fixed section 122 are small clearance sections having small clearances between the stator 32 and the housing 33 in contrast to a below-described large clearance section 113. Dimensions of the inner diameter D1 of the first stator fixing section 131 and the outer diameter D11 of the first fixed section 121, and the inner diameter D2 of the second stator fixing section 132 and the outer diameter D12 of the second fixed section 122 are set such that the first fitting section 111 and the second fitting section 112 has relation of intermediate fitting in JIS (Japanese Industrial Standards), or relation of clearance fit having a small dimensional difference (e.g., relation of tolerance zone class H7 of a hole and tolerance zone class f7 of a shaft in JIS).

Between the stator 32 and the housing 33, the large clearance section 113 having a larger clearance between the inner peripheral surface of the housing 33 and the outer peripheral surface of the stator 32 than the first fitting section 111 and the second fitting section 112 of interference fit is formed between the first fitting section 111 and the second fitting section 112. Herein, in the large clearance section 113, the inner diameter of the housing 33 and the outer diameter of the stator 32 are formed so as to have such dimensions as to attain clearance fit (clearance fit having a large dimensional difference (e.g., relation of tolerance zone class H9 of a hole and tolerance zone class c9 of a shaft in JIS). Examples include 0 to 0.1 mm for a single side).

In such a large clearance section 113, thermal grease is disposed between the housing 33 and the stator 32. This large clearance section 113 is preferably formed such that insertion resistance of the stator 32 by viscosity of thermal grease does not become excessive, and heat conduction between the stator 32 and the housing 33 through the thermal grease can be satisfactorily performed.

Hereinafter, an assembly method for the turbocharger 10 having the above configuration will be described.

Figure 6:
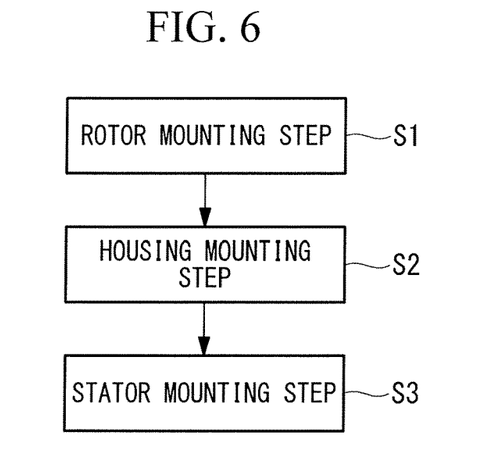
FIG. 6 is a flowchart illustrating a flow of the assembly method for the turbocharger according to the embodiment of the present invention.

As illustrated in FIG. 6, this assembly method for the turbocharger 10 includes a rotor mounting step S1, a housing mounting step S2, and a stator mounting step S3.

Figure 7:
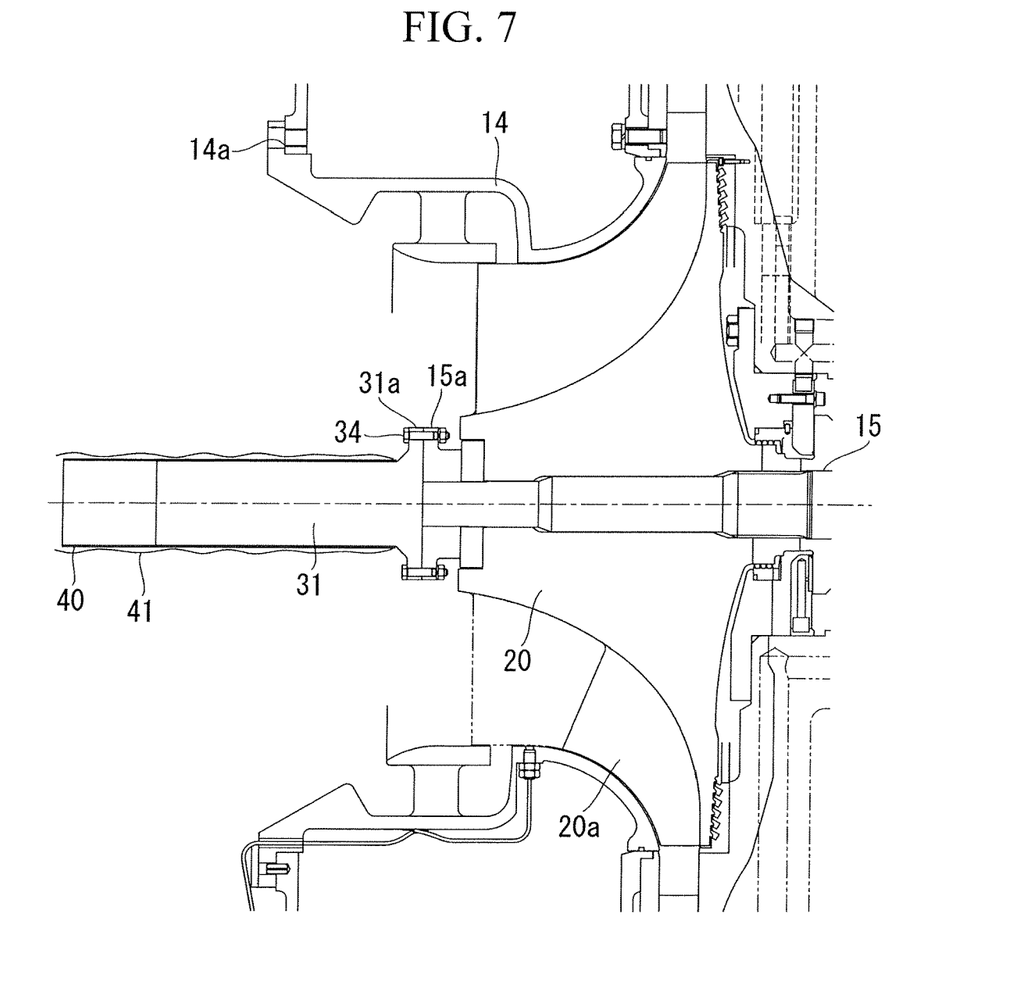
FIG. 7 is a longitudinal sectional view illustrating a state where the motor rotor is mounted in a rotor mounting step in the assembly method for the turbocharger according to the embodiment of the present invention.

As illustrated in FIG. 7, in the rotor mounting step S1, after assembly of the compressor impeller 20 is completed, the motor rotor 31 is connected to the end of the rotor shaft 15 by flange coupling, and a protective cylinder 40 is mounted on an outer peripheral side of the motor rotor 31. At the start of the rotor mounting step S1, in order to secure workability at the time of flange coupling of the motor rotor 31, the air guide casing 14 may not be mounted.

After the flanges 15a, 31a are joined in predetermined states, the rotor shaft 15 and the motor rotor 31 are coupled by using the plurality of bolts and nuts 34.

Thus, after the motor rotor 31 is connected to the rotor shaft 15, the protective cylinder 40 is preferably mounted on the motor rotor 31 in order to facilitate work in subsequent steps. As this protective cylinder 40, a material that is easily slidable and is non-magnetic is desirable, and a plastic based material such as nylon and polyethylene can be utilized. As an example of a suitable material, nylon (polyamide resin) equivalent to MC901 (product name) can be used. Furthermore, the protective cylinder 40 completely stores the motor rotor 31, and has a length protruding in the direction of the silencer 26 with respect to an end on a side close to the silencer 26 of the housing 33 that is assembled at a predetermined position in a below-described second step.

In order to protect the motor rotor 31 when a tool or a bolt used in the work is attracted to a motor rotor magnetic section to come into contact with the motor rotor magnetic section, a band-like member 41 of nylon or the like is desirably wound around the outside of the protective cylinder 40.

After the motor rotor 31 is connected to the rotor shaft 15, the air guide casing 14 may be fixed to be installed at a predetermined position.

Then, the housing mounting step S2 is performed.

In the housing mounting step S2, as illustrated in FIG. 3 and FIG. 4, a stator support unit HS obtained by coupling and integrating the housing 33 and the support member 35 is first mounted at a predetermined position of the air guide casing 14 so as to be concentric with the shaft center of the rotor shaft 15.

Herein, thermal grease is preferably thinly applied onto the inner peripheral surface of the housing 33. This thermal grease contributes to improvement of heat radiation during operation, and contributes to smooth sliding and smooth insertion in a step of incorporating the stator 32. As illustrated in FIG. 2, a grease discharge port 33t for pushing out and discharging excessive thermal grease is formed in the housing 33.

Figure 8:
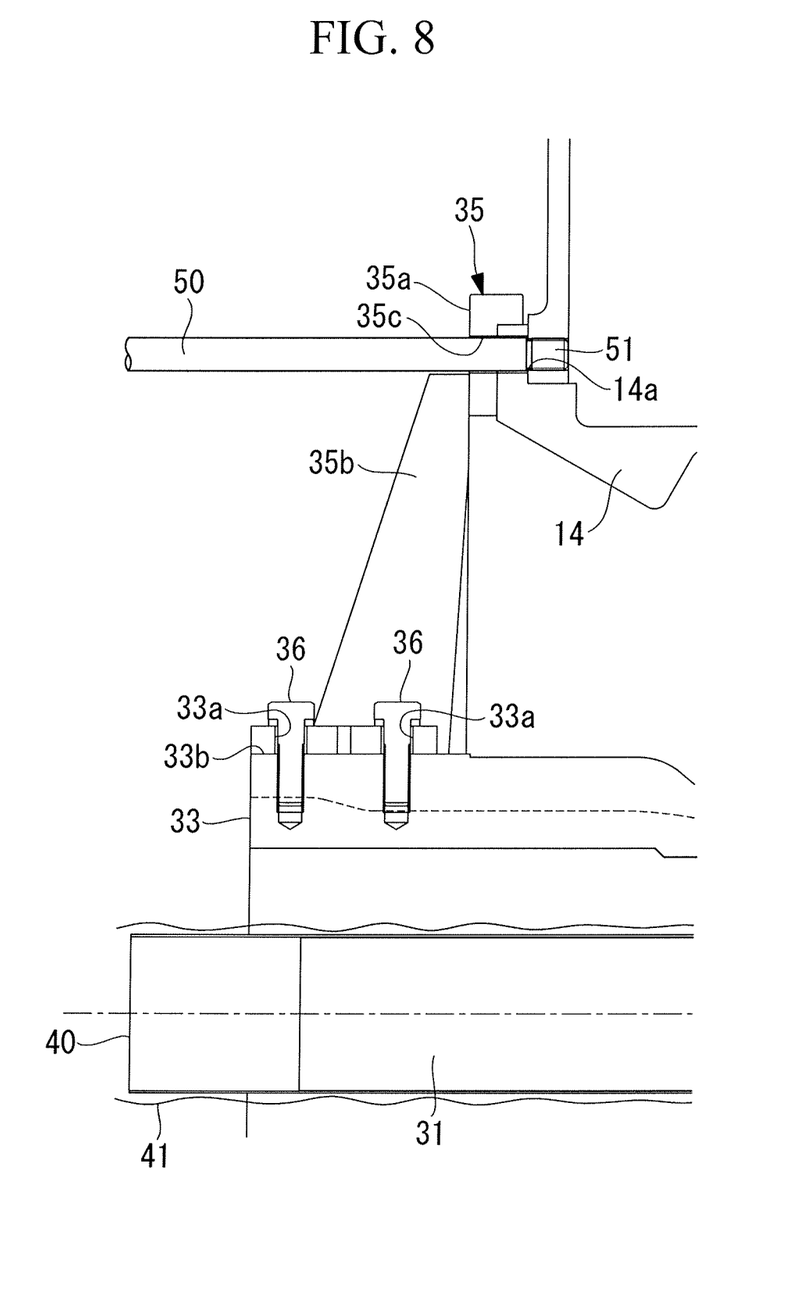
FIG. 8 is a longitudinal sectional view illustrating a state where the housing is mounted by using a guide bars in a housing mounting step in the assembly method for the turbocharger according to the embodiment of the present invention.

There is concern that when the stator support unit HS is mounted on the air guide casing 14, a metal member is attracted to a powerful permanent magnet of the motor rotor 31, and is stuck to be fixed or is damaged. Therefore, for example, as illustrated in FIG. 8, as a jig having a function of a guide for positioning and sliding, a guide bar 50 is desirably used.

The guide bar 50 is a rod-like member having an end provided with a screw section 51 having the same diameter as bolts 36 fixing the flange section 35a to the air guide casing 14. The guide bar 50 is used by screwing the screw section 51 into the bolt hole 14a of the air guide casing 14 into which each bolt 36 is screwed. This guide bar 50 has a sufficient length such that a leading end on a side opposite to the screw section 51 is not affected by magnetic force from the permanent magnet of the motor rotor 31 in a state where the guide bar 50 is mounted on the air guide casing 14.

When the stator support unit HS is assembled, a plurality of such guide bars 50 are screwed into the bolt holes 14a to be mounted. For example, when the two guide bars 50 are mounted by utilizing the bolt holes 14a disposed at upper and lower two places, stable positioning and sliding of the stator support unit HS is possible. In addition, when the three or more guide bars 50 are used, the positioning and sliding of the stator support unit HS is further stable.

After installation of the guide bars 50 is completed, the stator support unit HS is hung up by utilizing an eyebolt (not illustrated) or the like provided at a suitable portion of the stator support unit HS, and the leading ends of the guide bars 50 are inserted to be positioned into the bolt holes 35c of the flange section 35a. Thereafter, the stator support unit HS is slid along the guide bars 50 to be moved up to an installation surface of the air guide casing 14. At this time, the stator support unit HS approaches the motor rotor 31 to receive magnetic force, but is never attracted, since the stator support unit HS is held by the guide bars 50.

The stator support unit HS thus moved at a predetermined mounting position is temporarily fixed by sequentially screwing the bolts 36 into the bolt holes 35c, 14a into which the guide bars 50 are not screwed. Thereafter, the guide bars 50 are detached, the bolts 36 are screwed into the bolt holes 35c, 14a, and all the bolts 36 are fastened by a predetermined amount, so that fixing of the stator support unit HS is completed. As a result, the stator support unit HS is held at such a position that the center of the flange section 35a and the housing 33 coincide with the shaft center of the rotor shaft 15.

Then, the stator mounting step S3 is performed.

Figure 9:
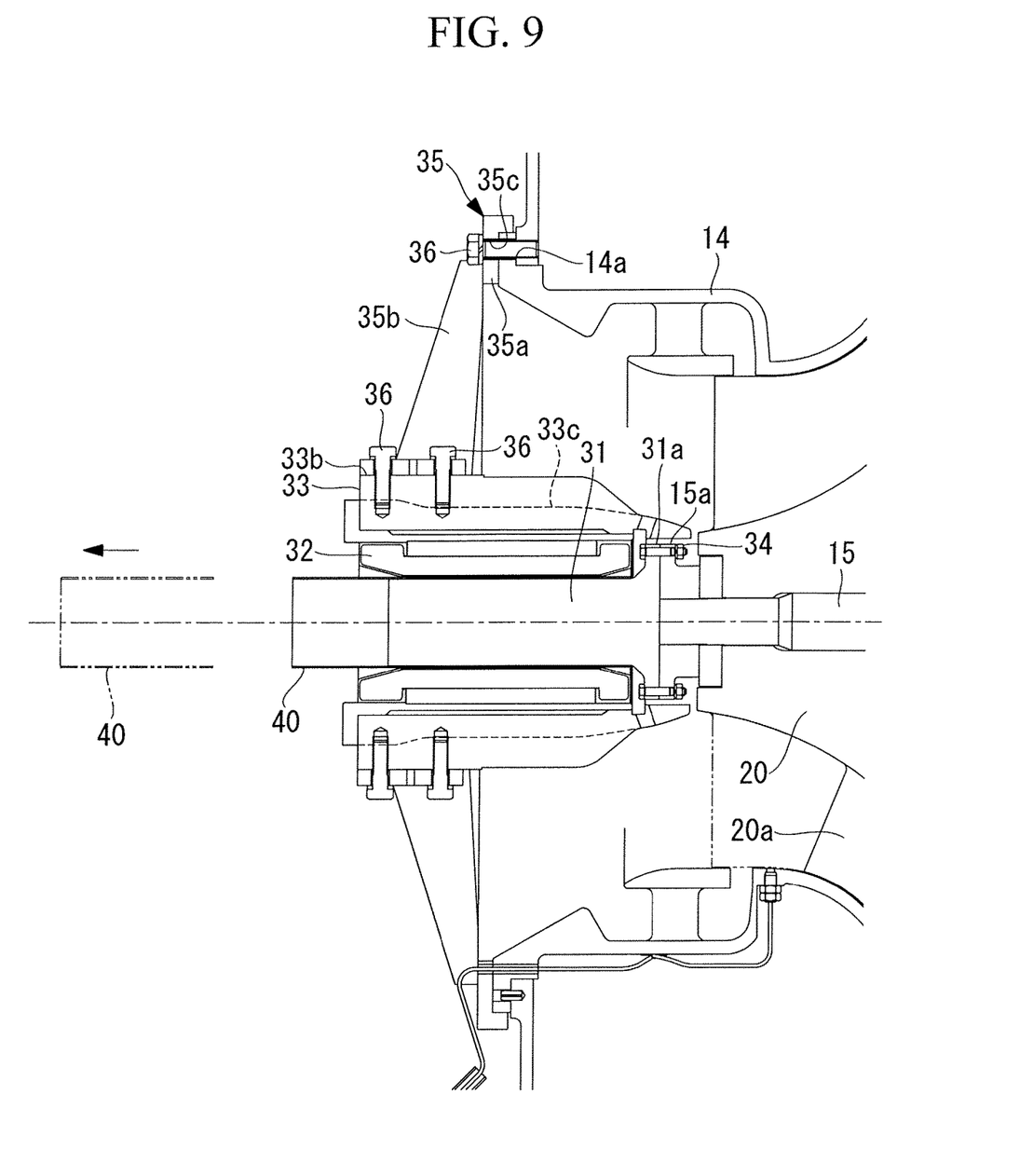
FIG. 9 is a longitudinal sectional view illustrating a state where the stator is inserted into the housing to be mounted in a stator mounting step in the assembly method for the turbocharger according to the embodiment of the present invention.

As illustrated in FIG. 9, in this stator mounting step S3, the band-like member 41 is first removed such that the band-like member 41 wound around the outer periphery of the protective cylinder 40 does not interfere with the stator 32.

Thereafter, the housing 33 concentric with the shaft center of the rotor shaft 15 is used as a guide, and the stator 32 is incorporated so as to be slid into the housing 33. That is, the inner diameter of the housing 33 and the outer diameter of the stator 32 substantially coincide with each other, and therefore the stator 32 is guided to the inner peripheral surface of the housing 33 to be inserted without radial position displacement.

Figure 10:
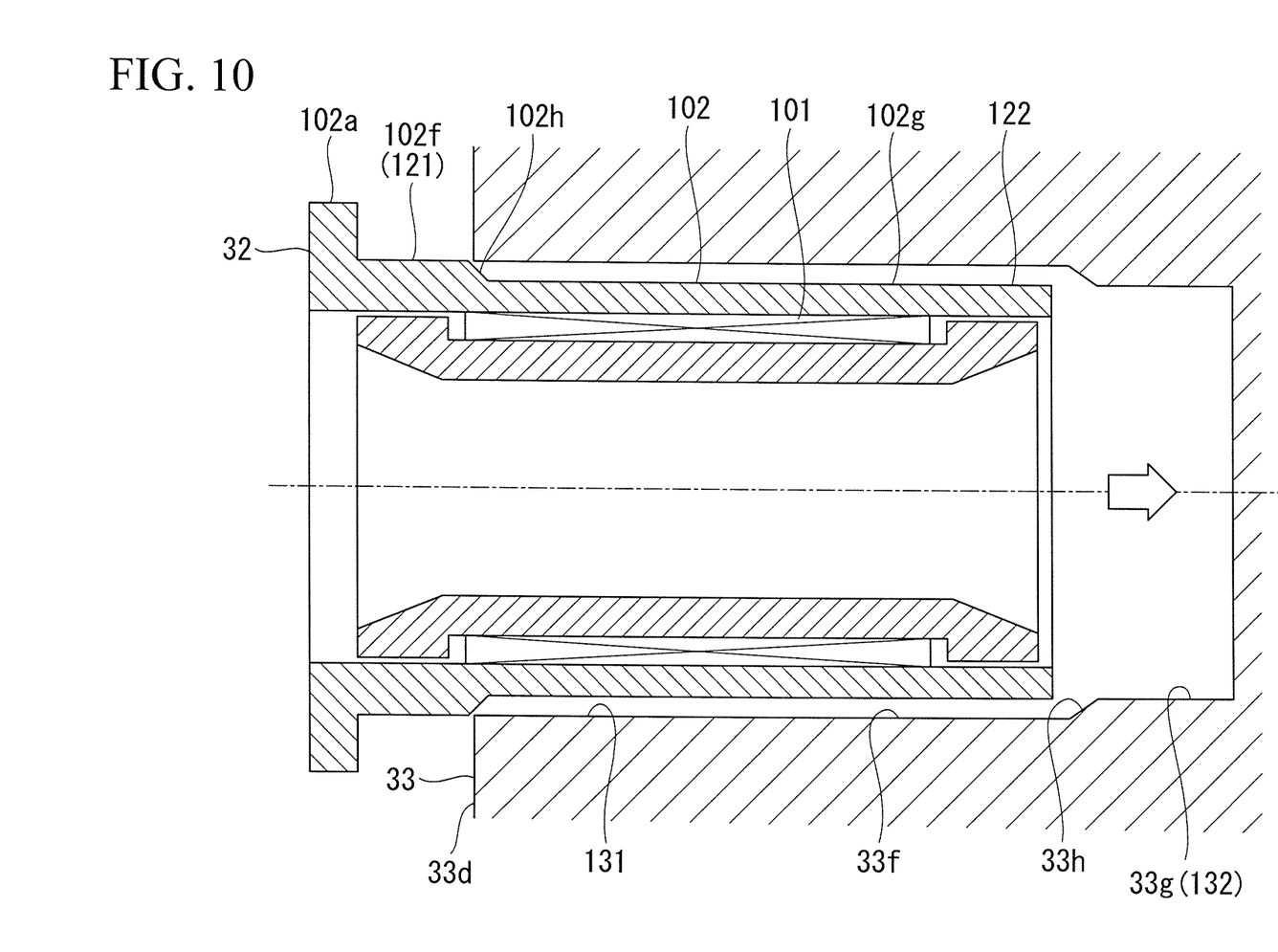
FIG. 10 is a longitudinal sectional view illustrating a state where the stator is being inserted into the housing in the stator mounting step in the assembly method for the turbocharger according to the embodiment of the present invention.

At this time, the inner diameter D2 of the second stator fixing section 132, and the outer diameter D12 of the second fixed section 122 are smaller than the inner diameter D1 of the first stator fixing section 131, and the outer diameter D11 of the first fixed section 121. Consequently, as illustrated in FIG. 10, when the stator 32 is inserted into the housing 33, the stator 32 is inserted from the first stator fixing section 131 side toward the second stator fixing section 132 side of the housing 33, so that it is possible to avoid interference of the stator 32 with the housing 33. Additionally, thermal grease is applied onto the inner peripheral surface of the housing 33, and therefore sliding of the stator 32 is improved, and smooth insertion is possible.

The protective cylinder 40 is mounted on the motor rotor 31, and therefore the inserted stator 32 and the motor rotor 31 never come into contact with each other. Even if the stator 32 is attracted to the motor rotor 31, the motor rotor 31 can be protected from an impact at the time of contact by existence of the protective cylinder 40, and breakage is prevented. Furthermore, the stator 32 and the motor rotor 31 are separated by the plate thickness of the protective cylinder 40, and therefore the stuck motor rotor 31 does not fixed and is easily removed.

After the stator 32 is thus incorporated at a predetermined position in the housing 33, the protective cylinder 40 is pulled out from the outer periphery of the motor rotor 31 to be detached. The motor 30 is provided with a predetermined clearance between the outer peripheral surface of the motor rotor 31 and the inner peripheral surface of the stator 32, and therefore the thickness of the protective cylinder 40 is set at the thickness of the clearance or less, so that the protective cylinder 40 can be easily pulled out even after the stator 32 is assembled.

Thereafter, as illustrated in FIG. 1, the cap 37 is mounted on a leading end of the housing 33 into which the stator 32 is inserted, and is fixed by the hexagon socket bolt 38. As a result, the stator 32 is held at the predetermined position in the housing 33, and assembly of the motor 30 is completed.

Furthermore, mounting of the silencer 26 is performed. In this mounting, the intermediate piece 27 is mounted on the air guide casing 14, and thereafter the silencer 26 is mounted on the intermediate piece 27. Before the silencer 26 is mounted on the intermediate piece 27, accompanying wires on the motor 30 side are bundled to be put into a predetermined wiring passage.

Consequently, assembly of the turbocharger 10 is completed.

In a case where a step of detaching the housing 33 for maintenance occurs, work is performed in a manner reverse to the above, so that the stator 32 can be easily detached from the housing 33.

According to the above motor 30, turbocharger 10, and assembly method for the turbocharger 10, the stator 32 located in the housing 33 is precisely positioned to be fixed at the two places at the interval in the axial direction of the stator 32 by the first fitting section 111 of the first stator fixing section 131 and the first fixed section 121, and the second fitting section 112 of the second stator fixing section 132 and the second fixed section 122. Additionally, the stator 32 and the housing 33 are reliably in close contact with each other by the first fitting section 111 and the second fitting section 112, and therefore high heat conduction is secured between the stator 32 and the housing 33. Consequently, it is possible to secure cooling performance of the stator 32 by the housing 33, and highly exhibit performance of the motor 30.

The inner diameter D2 of the second stator fixing section 132 and the outer diameter D12 of the second fixed section 122 are smaller than the inner diameter D1 of the first stator fixing section 131 and the outer diameter D11 of the first fixed section 121. Consequently, when the stator 32 is inserted into the housing 33, the stator 32 is inserted from the first stator fixing section 131 side toward the second stator fixing section 132 side of the housing 33, so that it is possible to easily assemble the stator 32 to the housing 33 while suppressing interference of the stator 32 with the housing 33.

Therefore, it is possible to improve an assembling property while securing positioning precision of the stator 32.

The large clearance section 113 is formed between the first fitting section 111 and the second fitting section 112. In the large clearance section 113, the inner diameter D1 of the housing 33 and the outer diameter D12 of the stator 32 are formed so as to have such dimensions as to attain clearance fit.

Consequently, when the stator 32 is inserted into the housing 33, interference of the stator 32 with the housing 33 can be suppressed until the first fixed section 121 is fitted to the first stator fixing section 131, and the second fixed section 122 is fitted to the second stator fixing section 132 after the second fixed section 122 of the stator 32 passes through the first stator fixing section 131 side of the housing 33.

The thermal grease is disposed in the large clearance section 113, so that heat conduction can be secured between the stator 32 and the housing 33 also in the large clearance section 113. Additionally, insertion of the stator 32 into the housing 33 can be more easily performed by the thermal grease.

In the above embodiment, the turbocharger 10 is the electric-motor assisted turbocharger including the motor 30. However, the present invention is not limited to this, and can be applied also to a turbocharger having a power generation function.

REFERENCE SIGNS LIST 10 turbocharger
10C compressor section
10T turbine section
15 rotor shaft
30 motor
31 motor rotor
32 stator 33 housing
33f first inner peripheral surface
33g second inner peripheral surface
33h radially contracted surface
101 stator body
102 stator case
102a flange section
102f first outer peripheral surface
102g second outer peripheral surface
102h radially contracted surface
111 first fitting section
112 second fitting section
113 large clearance section
121 first fixed section
122 second fixed section
131 first stator fixing section
132 second stator fixing section
D1, D2 inner diameter
D11, D12 outer diameter
S1 rotor mounting step
S2 housing mounting step
S3 stator mounting step

The invention claimed is:

1. A motor comprising:
a housing that is cylindrical;
a stator located inside the housing; and
a motor rotor that rotates inside the stator, wherein
the housing comprises an inner peripheral surface including:
a first inner peripheral surface formed over a predetermined length from a first end side of the housing toward a second end side of the housing so as to have a constant inner diameter; and
a second inner peripheral surface formed at a portion near the second end of the housing with respect to the first inner peripheral surface,
a first stator fixing section which fixes the stator is formed in the first inner peripheral surface of the housing,
a second stator fixing section which has a smaller inner diameter than the first stator fixing section is formed at a position spaced from the first stator fixing section in the axial direction of the housing, in the second inner peripheral surface of the housing
the stator includes:
a stator body having a core wound around a coil; and
a stator case storing the stator body,
the stator case has an end formed with a flange section protruding toward an outer peripheral side,
the stator case has an outer peripheral surface including:
a first outer peripheral surface formed over a predetermined length shorter than the first inner peripheral surface of the housing from a side close to the flange section so as to have a constant outer diameter; and
a second outer peripheral surface formed so as to have an outer diameter smaller than the first outer peripheral surface,
a first fixed section fitted to the first stator fixing section of the housing is formed in the first outer peripheral surface of the stator case,
a second fixed section which has a smaller outer diameter than the first fixed section and which is fitted to the second stator fixing section of the housing is formed at a position spaced from the first fixed section in the axial direction of the stator, in the second outer peripheral surface of the stator case,
an entire length in a longitudinal direction of the first outer peripheral surface of the stator case radially faces to be fitted to the first inner peripheral surface of the housing,
the housing further comprises a radially contracted surface which is between the first inner peripheral surface and the second inner peripheral surface, and which is formed in a tapered shape such that an inner diameter of the radially contracted surface gradually reduces from the first inner peripheral surface toward the second inner peripheral surface,
the stator case further comprises a radially contracted surface which is formed between the first outer peripheral surface and the second outer peripheral surface, and which is formed in a tapered shape such that an outer diameter of the radially contracted surface gradually reduces from the first outer peripheral surface toward the second outer peripheral surface,
between a first fitting section, which is comprised of the first stator fixing section and the first fixed section, and a second fitting section, which is comprised of the second stator fixing section and the second fixed section, a large clearance section having a larger clearance between the inner peripheral surface of the housing and the outer peripheral surface of the stator than the first fitting section and the second fitting section is formed, the large clearance section being a space which is surrounded by the first outer peripheral surface of the housing, the radially contracted surface of the housing, the second outer peripheral surface of the stator case, and the radially contracted surface of the stator case.

2. The motor according to claim 1, wherein
an inner diameter of the housing and an outer diameter of the stator in the large clearance section are formed so as to have such dimensions as to attain clearance fit.

3. The motor according to claim 1, wherein
thermal grease is disposed between the housing and the stator in the large clearance section.

4. A turbocharger comprising:
a compressor section that compresses air;
a rotor shaft that is connected to the compressor section; and
the motor according to claim 1, the motor having the motor rotor connected to an end of the rotor shaft.

5. An assembly method for a turbocharger being an assembly method for the turbocharger according to claim 4, the assembly method comprising:
a rotor mounting step of connecting the motor rotor to the rotor shaft and mounting the motor rotor on the rotor shaft;
a housing mounting step of fixing and supporting the housing so as to be concentric with the rotor shaft; and
a stator mounting step of inserting and incorporate the stator into the housing from a side of the first stator fixing section toward a side of the second stator fixing section of the housing.

* * * * *